United States Patent

[11] 3,548,156

[72] Inventor Theodore H. Davey
 Pasadena, Calif.
[21] Appl. No. 760,164
[22] Filed Sept. 17, 1968
[45] Patented Dec. 15, 1970
[73] Assignee The Aro Corporation
 Bryan, Ohio
 a corporation of Delaware

[54] ELECTRICAL HEATER CIRCUIT
 3 Claims, 1 Drawing Fig.
[52] U.S. Cl. .................................................. 219/499
[51] Int. Cl. .................................................. H05b 1/02
[50] Field of Search .................................... 219/494,
 499, 501

[56] References Cited
UNITED STATES PATENTS
3,407,286 10/1968 Roby ........................... 219/501
3,427,436 2/1969 Finnegan ...................... 219/499X Primary Examiner—Bernard A. Gilheany
Assistant Examiner—F. E. Bell
Attorney—Molinare, Allegretti, Newitt & Witcoff ABSTRACT: A full-wave, phase-controlled, electronic power-switching control system for maintaining the temperature within a heated chamber at a predetermined desired level. A thermistor positioned to sense the temperature within the chamber is connected in one arm of a bridge circuit such that a transistor, whose base-emitter path is connected across the bridge, becomes conductive when a decrease in temperature occurs. The current flowing through the collector-emitter path of this transistor charges a timing capacitor which gages a unijunction transistor into conduction. An increase in this charging current causes a controlled rectifier to "fire" earlier in each half-cycle, increasing the average power delivered to the heating element and hence returning the chamber to the desired temperature.

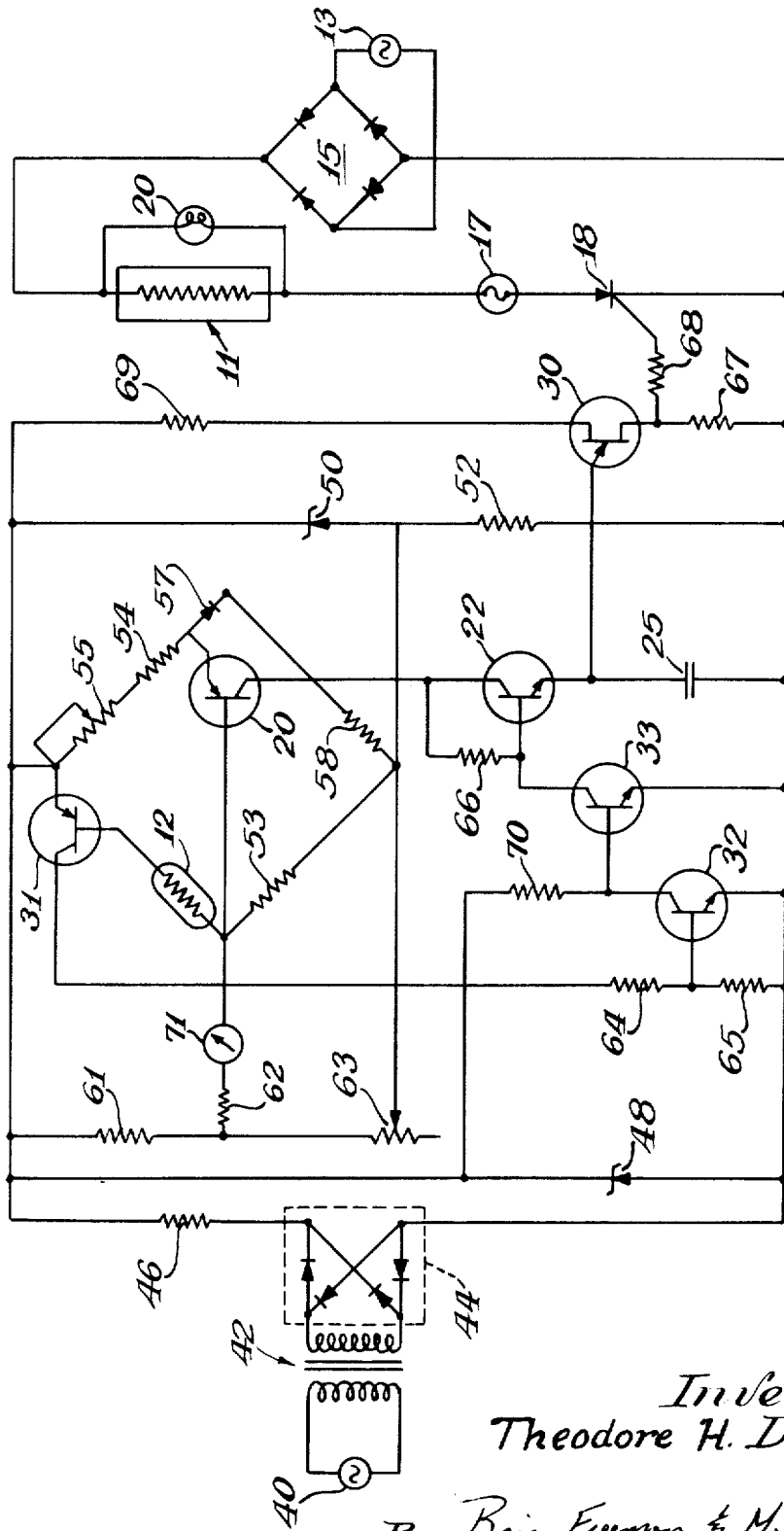

ELECTRICAL HEATER CIRCUIT

BACKGROUND OF THE INVENTION

This invention relates generally to electronic power control circuits and, more particularly, although in its broader aspects not exclusively, to a control circuit for maintaining the temperature in a chamber at a prescribed, selectable level.

The bimetallic switch is perhaps the most common means for thermostatically controlling an electrical heater such that the temperature of a given region is maintained at the desired level. Normally, the bimetallic switch is adapted to close whenever the temperature in the region falls below a predetermined value, thus supplying electrical power to the heater. The element again opens when the temperature in the region reaches the desired level, terminating the application of power to the heater.

Such single control systems are characterized by some temperature "overshoot"; that is, the heater itself reaches a much higher relative temperature when power is applied so that, even after the heater is turned OFF, it continues to heat the region for some time, causing the temperature level to rise above the desired level. In consequence, with bimetallic control systems of the type described, the temperature in the controlled region actually fluctuates back and forth between two different levels.

The present invention takes the form of a novel circuit arrangement for providing continuous control of the heater element such that the amount of the power applied to the heating element is directly related to the difference between the desired temperature and the actual temperature.

As an example, the present invention may be applied to advantage in connection with melting and liquid-heating devices in which precise temperature control is required. Typical among these are systems for supplying hot, liquified adhesives which, after they are applied, solidify upon cooling. For best performance, it is desirable that the solid adhesive charge placed in the chamber be rapidly melted and brought rapidly to a desired temperature. At the same time, the temperature control system should be capable of preventing overheating due to temperature "overshoot".

SUMMARY OF THE INVENTION

In accordance with the principles of the present invention, the average power applied to the heating element is controlled by varying the "firing angle" of at least one controlled rectifier connected between the heating element and the power source. In accordance with a further feature of the invention, this firing angle is varied under the control of a thermistor connected as one arm in a bridge sensing circuit. The desired temperature level within the heating chamber is varied by adjusting a variable resistance connected in another arm of the bridge circuit. A transistor whose base-emitter path is connected across the bridge charges a timing capacitor at a rate dependent upon the degree of bridge imbalance. A unijunction transistor serves as a threshold device to fire the controlled rectifier when the charge across the capacitor reaches a predetermined level.

In accordance with a further feature of the invention, protection against dangerous overheating conditions is afforded by means of a sensing transistor connected to detect the absence of current flow through the thermistor circuit. In the event of an open circuit condition in the thermistor circuit (which would otherwise indicate a "cool" chamber), transistor-switching means are employed to open the capacitor charging circuit and thus prevent the controlled rectifier from being fired.

In accordance with still another feature of the invention, the thermistor sensing circuit is also employed as a portion of a second bridge circuit including metering means for accurately measuring the temperature within the heating chamber.

As contemplated by the invention, when the heating system is first turned on the cool thermistor is operative to rapidly charge the timing capacitor and thus fire the controlled rectifier very early in each half-cycle of power. As the temperature of the chamber approaches the desired value, the bridge circuit approaches a null condition and the amount of charging current delivered to the timing capacitor decreases. The firing angle of the controlled rectifier is thus retarded, decreasing the amount of power applied to the heater. In consequence, the chamber is rapidly brought to the desired temperature level yet temperature "overshoot" is obviated. Under steady state conditions, the control circuit supplies only the precise amount of "warming" current needed to compensate for the dissipation of heat within the chamber to its ambient surroundings.

These and other objects, features and advantages of the invention will become more apparent through a consideration of the following detailed description. During the course of this description, reference will frequently be made to the attached drawing.

BRIEF DESCRIPTION OF THE DRAWING

The single FIG. of the drawing is a schematic diagram of a phase-controlled heater power regulating circuit which embodies the principles of the invention.

DESCRIPTION OF THE PREFERRED EMBODIMENT

The circuit shown in the drawing is adapted to control the amount of power supplied to a heating element indicated generally at 11 in response to changes in the temperature sensed by a thermistor 12. The control circuit is a "closed loop" system in the sense that increasing the amount of power to the heating element 11 raises the temperature in the surrounding region (which includes a thermistor 12) and has the effect of reducing the amount of power applied to the heating element 11.

Power for the heating element 11 is obtained from an AC source 13, rectified by the bridge rectifier 15 to form pulsating DC and supplied to the heating element 11 through the series combination of a fuse 17 and the anode-cathode path of a silicon controlled rectifier (SCR) 18.

An indicating lamp 20 is connected in parallel with the heating element 11 and accordingly glows with a brilliance related to the amount of power applied to the heating element 11.

In operation, the controlled rectifier 18 is gated into conduction at a delayed phase angle following the beginning of each half-cycle, the amount of phase delay being called the "firing angle". By decreasing the firing angle, a larger portion of each half-cycle of alternating current is allowed to flow through the heating element 11. Correspondingly, the amount of average power applied to the heating element 11 can be reduced by increasing the firing angle; that is, by delaying the time at which SCR 18 is fired.

The embodiment of the invention shown in the attached drawing is capable of regulating the temperature within a chamber to which heating element 11 is attached with a high degree of accuracy. The thermistor 12 is placed in thermal contact with the chamber and forms a part of a bridge sensing circuit. When the temperature sensed by the thermistor 12 is below that desired, the bridge is "unbalanced," turning ON a transistor 20 and supplying a charging current through transistor 22 to a timing capacitor 25. The rate at which the capacitor 25 is charged is directly related to the amount of difference between the desired temperature level and the actual temperature level sensed by the thermistor 12. When the charge across capacitor 25 reaches a predetermined value, a unijunction transistor 30 is "fired," in turn firing the controlled rectifier 18.

The combination of transistors 31, 32, 33 and 22, as well as their associated circuitry, make up a protection circuit for preventing the application of power to heating element 11 in the event of an open circuit condition in the circuit including thermistor 12. should such an open circuit condition develop, base drive is removed from transistor 31 and hence from transistor 32, placing transistor 33 in a saturated conductive state. This condition removes the base drive from transistor 22, thereby preventing capacitor 25 from charging and hence preventing the firing of unijunction transistor 30 and SCR 18.

Low voltage power for the control circuitry is obtained from an AC source 40 and is converted into low level pulsating DC by means of a stepdown transformer 42 and a bridge rectifier 44. The combination of a current limiting resistor 46 and a voltage limiting Zener diode 48 limit the peak voltage applied to the control circuitry. A second Zener diode 50 is connected in series with a resistor 52 across the Zener diode 48. The voltage appearing across Zener diode 50 is used to power the temperature sensing bridge circuitry.

This bridge is made up of a first arm comprising the series combination of the emitter-base path of transistor 31 and the thermistor 12; a second path comprising a fixed resistor 53; a third arm comprising a series combination of fixed resistor 54 and variable resistor 55 (used for temperature control); and a fourth arm comprising the series combination of a forward biased diode 57 and a fixed resistor 58.

The bridge circuitry controls the conductivity of transistor 20, the base of which is connected to the junction of the first and third arm of the bridge and the emitter of which is connected to the junction of the second and fourth arms of the bridge.

As the temperatures sensed by the thermistor 12 falls, the resistance of the thermistor 12 increases, thus decreasing the voltage applied to the base of transistor 20. Should this voltage fall to a sufficiently low level, transistor 20 begins to conduct and current flows through its emitted-collector path and through the transistor 22 to charge capacitor 25. The cooler thermistor 12 is, the more rapidly capacitor 25 is charged, and the earlier in each half-cycle is the controlled rectifier 18 gating into conduction. This increases the average power applied to the heating element 11 and causes the temperature of the chamber to increase. As the temperature in the chamber increases, the resistance of thermistor 12 drops and, eventually, a substantially balanced bridge condition will occur in which very little current flows through the transistor 20. The temperature at which this substantially balanced condition occurs may be adjusted by varying the setting of potentiometer 55. Increasing the resistance of potentiometer 55 permits the balanced condition to occur at a lower temperature level. Correspondingly, the temperature desired for the chamber may be increased by decreasing the setting of potentiometer 55.

With thermistor 12 acting as a sensor, the action of the control system drives the temperature within the chamber heated by element 11 to a value at which the resistance of the thermistor is approximately equal to the product of (1) the resistance of resistor 53 and (2) the resistance of the series combination of potentiometer 55 and resistor 54 divided by (3) the resistance of resistor 58.

Because a certain forward voltage is needed across the base-emitter junction of transistor 20 to cause that transistor to begin conduction, the diode 57 is inserted in series with resistor 58 to provide an equal static forward voltage drop. Diode 57 is preferably chosen to have temperature characteristics like those of the base-emitter junction of transistor 20 so that temperature compensation is effected.

The combination of fixed resistors 61 and 62, potentiometer 63, and ammeter 71 work in combination with the thermistor 12 and resistor 53 to form a second bridge circuit such that meter 71 deflects in proportion to the temperature sensed by thermistor 12 potentiometer 63 may be adjusted to calibrate the meter.

For completeness, the following table of element values which may be used for the components shown in the attached FIG. is given. It should, of course, be understood that considerable variation in these values is possible without changing the operation of the circuit and that thus they are by no means critical.

Transistor 20—2N3638a PNP transistor.
Transistor 22—2N2924 NPN transistor.
Transistor 31—2N3638a PNP transistor.
Transistor 32—2N2924 NPN transistor.
Transistor 33—2N2924 NPN transistor.
Transistor 30—2N2646 unijunction transistor.
Thermistor 12—GA51P1 thermistor.
Zener diode 48—1N1608 22 v. Zener diode.
Diode 50—1N1600 4.7 v. Zener diode.
Resistor 46—100 ohm, 8 watt resistor.
Resistor 53—1.6 k-ohm, 1% resistor.
Resistor 54—100 ohm, 1% resistor.
Potentiometer 55—0-1k-ohm variable resistor.
Resistor 58—560 ohm, 1% resistor.
Resistor 52—150 ohm, 5 watt resistor.
Resistor 61—120 ohm, 1 watt resistor.
Resistor 62—72k-ohm, 1 watt resistor.
Resistor 64—6.8k-ohm, 1 watt resistor.
Resistor 65—3.3k-ohm, 1 watt resistor.
Resistor 66—3.3k-ohm, 1 watt resistor.
Resistor 67—39 ohm, 1 watt resistor.
Resistor 68—22 ohm, 1 watt resistor.
Resistor 69—220 ohm, 1 watt resistor.
Resistor 70—15k-ohm, 1 watt resistor.
Potentiometer 63—0-50 ohm potentiometer.
Capacitor 25—0.2 msd., 200 v. capacitor.
Diode 57—1N536 type diode.
SCR 18—Type 3COD silicon controlled rectifier.
Meter 7—0-50 microamperes.

It is to be further understood that the detailed description of the preferred embodiment which has been set forth above is merely illustrative of one application of the principles of the invention. Numerous modifications could be made to this embodiment without departing from the true spirit and scope of the invention.

I claim:

1. Apparatus for maintaining the temperature in a given region at a predetermined selectable value which comprises, in combination:
    an electrically operated hearing element in said region, a thermistor in thermal communication with said region;
    a bridge circuit wherein said thermistor, a variable resistance, and a pair of fixed resistors form first, second, third and fourth arms respectively of said bridge, said first and third arms being connected in series and in parallel with the series combination of said second and fourth arms;
    current sensing means for detecting the absence of current flowing through said thermistor and means responsive to such detection for maintaining said switching device in a nonconductive state;
    a transistor having a collector-emitter path and an emitter-base path, said base-emitter path being connected between the junction of said first and third arms and the junction of said second and fourth arms of said bridge;
    a timing capacitor charged through said collector-emitter path of said transistor;
    a solid state switching device having a control electrode said device being connected in series with said heating element across a source of pulsating electrical energy; and
    a threshold device having an output connected to said control electrode for gating said switching device into conduction whenever the voltage across said capacitor reaches a predetermined value whereby the average electrical power delivered to said heating element is controlled in response to the temperature sensed by said thermistor.

2. Apparatus as set forth in claim 1 wherein said current sensing means comprises a second transistor having its base-emitter path connected in series with said thermistor and wherein said disabling means comprises a third transistor interconnected with said capacitor, the conductivity of said third transistor being controlled by said second transistor such that said capacitor is maintained in a discharged state whenever said second transistor becomes nonconductive due to the absence of current through said thermistor.

3. Apparatus for maintaining the temperature in a given region at a predetermined selectable value which comprises, in combination:
    an electrically operated heating element is said region;

a thermistor in thermal communication with said region;

a bridge circuit wherein said thermistor, a variable resistance, and a pair of fixed resistors form first, second, third and fourth arms respectively of said bridge, said first and third arms being connected in series and in parallel with the series combination of said second and fourth arms;

a transistor having a collector-emitter path and an emitter-base path, said base-emitter path being connected between the junction of said first and third arms and the junction of said second and fourth arms of said bridge;

a timing capacitor charged through said collector-emitter path of said transistor, a solid state switching device having a control electrode said device being connected in series with said heating element across a source of pulsating electrical energy;

and a threshold device having an output connected to said control electrode for gating said switching device into conduction whenever the voltage across said capacitor reaches a predetermined value whereby the average electrical power delivered to said heating element is controlled in response to the temperature sensed by said thermistor; and a threshold device comprising a unijunction transistor having its gate electrode connected to said capacitor and having its inter-base path connected in series with a resistor across a source of pulsating electrical energy having the same phase as said first source such that said switching device is gated into conduction whenever the voltage across said capacitor reaches a predetermined value whereby the average electrical power delivered to said heating element is controlled in response to the temperature sensed by said thermistor.